(12) United States Patent
Kan et al.

(10) Patent No.: US 6,386,577 B1
(45) Date of Patent: May 14, 2002

(54) SIDE-COLLISION AIR BAG DEVICE (75) Inventors: Makoto Kan; Takashi Honda; Naotoshi Takemura; Takashi Aoki; Tatsuya Terauchi; Naohiro Takahashi, all of Wako (JP)

(73) Assignee: Honda Giken Kogyokabushiki Kaisha, Tokyo (JP)

( * ) Notice: Subject to any disclaimer, the term of this patent is extended or adjusted under 35 U.S.C. 154(b) by 0 days.

(21) Appl. No.: 09/533,972

(22) Filed: Mar. 23, 2000

(30) Foreign Application Priority Data

Mar. 29, 1999 (JP) ............................................ 11-086913

(51) Int. Cl.[7] .............................................. B60R 21/22
(52) U.S. Cl. ............................... 280/730.2; 280/728.1; 280/728.2; 280/743.1; 297/216.13
(58) Field of Search ......................... 280/730.2, 730.1, 280/728.2, 728.3, 743.1; 297/216.13

(56) References Cited

U.S. PATENT DOCUMENTS

| 5,498,030 A | * | 3/1996 | Hill et al. ............. 280/743.1 X |
| 5,651,582 A | * | 7/1997 | Nakano ............... 280/730.2 X |
| 5,676,394 A | * | 10/1997 | Maly ................... 280/730.2 X |
| 5,799,970 A | * | 9/1998 | Enders ..................... 280/730.2 |
| 5,863,063 A | * | 1/1999 | Harrell .................... 280/730.2 |
| 5,890,734 A | * | 4/1999 | Saderholm ............... 280/730.2 |
| 5,924,724 A | * | 7/1999 | Nakamura et al. ....... 280/730.2 |
| 5,951,039 A | * | 9/1999 | Severinski et al. .. 280/730.2 X |
| 5,967,603 A | * | 10/1999 | Genders et al. ...... 280/730.2 X |

FOREIGN PATENT DOCUMENTS

JP 10-71918 3/1998

* cited by examiner

Primary Examiner—Lanni Mai
Assistant Examiner—Toan To
(74) Attorney, Agent, or Firm—Armstrong, Westerman & Hattori, LLP

(57) ABSTRACT

A module case having an air bag module accommodated therein is disposed in a side face of a seat back, so that a lid of the module case is opened by a pressure of an air bag expanded upon a side collision of a vehicle, and the air bag is deployed through the resulting opening, termed the "primary" opening into a vehicle compartment. As a result of a tear line provided in the module case, even if the lid is held down by the door which has been deformed by a shock resulting from the collision, so that the lid cannot be opened to provide the primary opening, the tear line in a case body of the module case is broken, whereby a front wall is pivoted forwardly to form an alternate or "secondary" opening from the module case. Therefore, the air bag can be deployed without hindrance through the alternate secondary opening defined in the front wall of the module case into the vehicle compartment.

4 Claims, 7 Drawing Sheets

SIDE-COLLISION AIR BAG DEVICE

The present invention relates to a side-collision air bag device which is designed so that an air bag is deployed from an air bag module disposed in a side face of a seat back into a vehicle compartment to protect an occupant upon side-collision of a vehicle.

BACKGROUND OF THE INVENTION

A side-collision air bag device of the concerned type is disclosed as second and third embodiments in Japanese Patent Application Laid-open No. 10-71918. This conventional device is designed so that a lid of a module case having the air bag module accommodated therein is exposed to the side face of the seat back whereby the air bag is expanded within the module case upon collision of the vehicle and forces the lid open to become deployed into the vehicle compartment.

In such conventional side-collision air bag device, there is a possibility that, when a door or a center pillar is deformed toward the inside of the vehicle compartment due to the side collision of the vehicle and is brought into contact with the side face of the seat back, the lid of the module case may be held by such an urging force and as a result, cannot be opened, whereby the smooth expansion of the air bag is impeded.

The present invention has been accomplished with the above circumstance in view, and it is an object of the present invention to ensure that, even if the door or the center pillar is deformed toward the seat back by a shock resulting from the collision, the air bag can be reliably deployed from the air bag module accommodated in the module case.

SUMMARY OF THE INVENTION

To achieve the above object, there is provided a side-collision air bag device comprising an air bag module which is accommodated in a module case including a case body and a lid and which is disposed in a side face of a seat back so that an air bag is deployed through an opening, termed the "primary opening", defined in the lid into a vehicle compartment by opening the lid exposed to the side face of the seat back by a pressure of the air bag expanded from the air bag module. A tear line is formed in a wall of the case body and is broken by the pressure of the expanded air bag to open the wall in a direction different from a direction for opening the lid, whereby the air bag can be deployed into the vehicle compartment through a secondary opening defined in the wall.

With the above arrangement, when the air bag of the air bag module accommodated in the case body of the module case is expanded due to a side collision of the vehicle, the lid of the module case is opened by an expansion pressure, and the air bag is deployed through the primary opening defined in the case body into the vehicle compartment. If a door or a center pillar is deformed upon the collision to come close to the seat back, whereby the lid of the module case is held down so that it cannot be opened to form the primary opening, the tear line formed in the wall of the case body is broken by the pressure of expansion of the air bag to open the lid in a direction different from the direction of the primary opening formed by opening of the lid with respect to the module case and hence, the air bag can be deployed through a secondary opening defined in the case body without hindrance.

For a better understanding of the invention, its operating advantages and the specific objectives obtained by its use, reference should be made to the accompanying drawings and description which relate to a preferred embodiment thereof.

DETAILED DESCRIPTION OF THE PREFERRED EMBODIMENT

Figure 1:
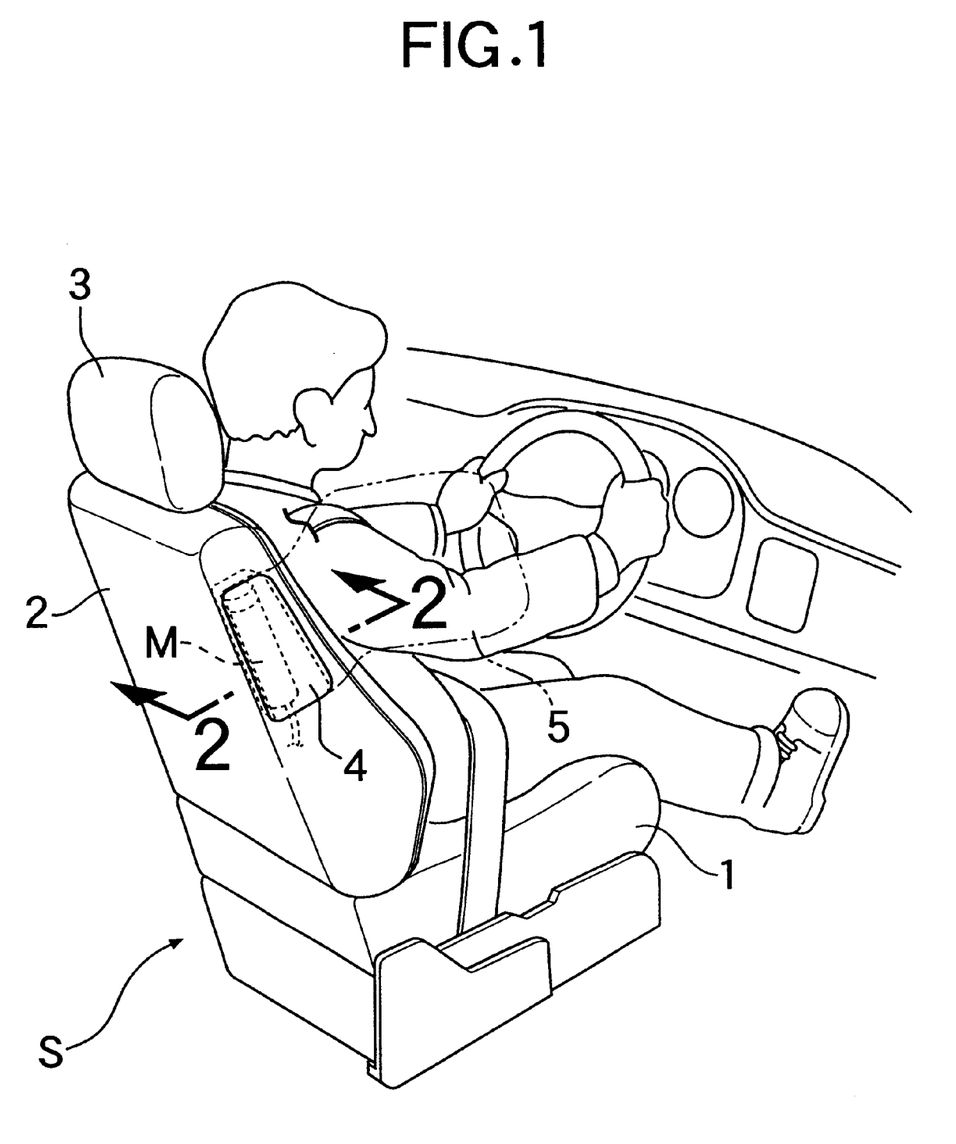
FIG. 1 is a perspective illustration of a seat provided with a side-collision air bag device according to an embodiment of the present invention.
Figure 7:
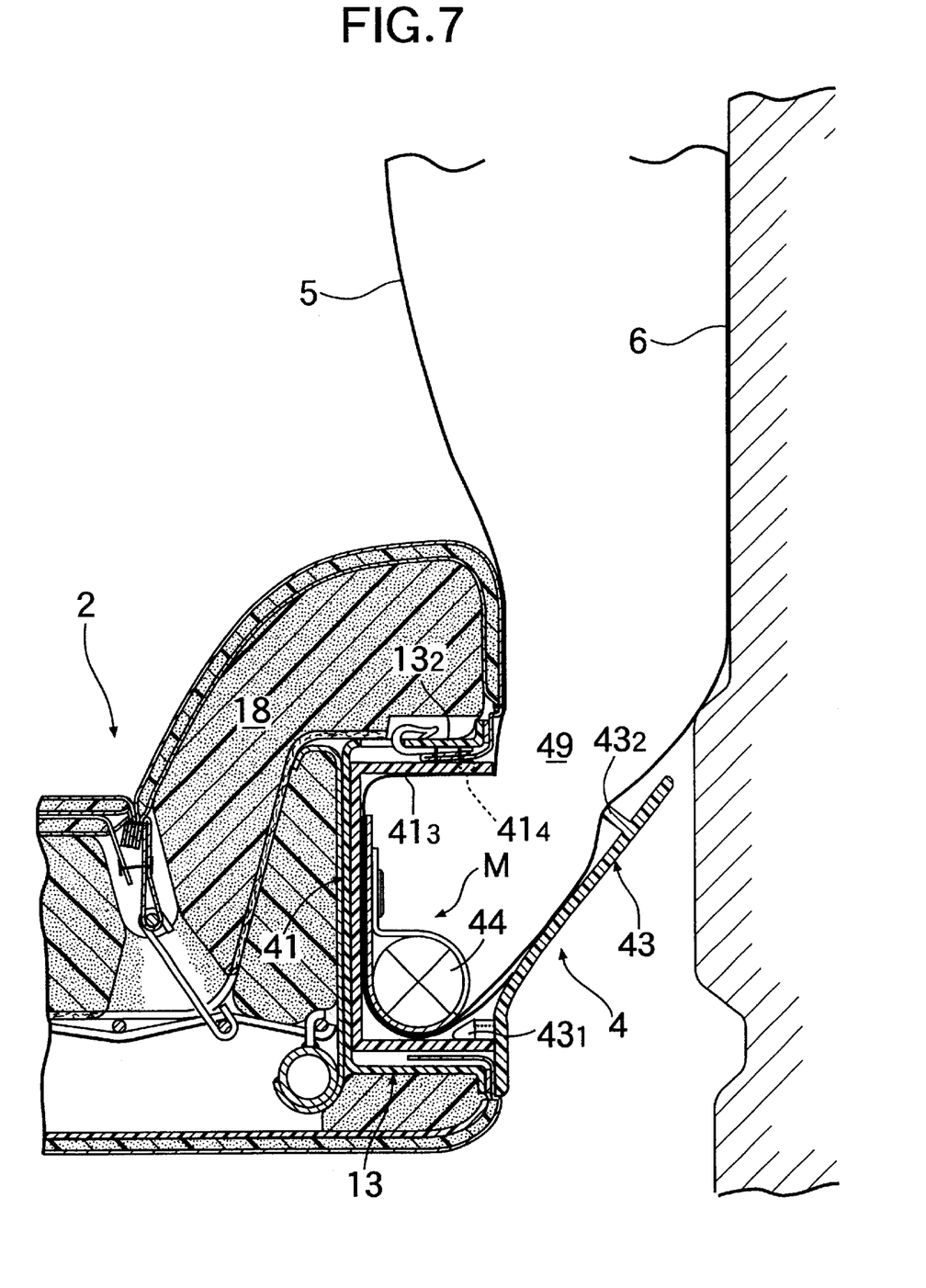
FIG. 7 is a view explaining the operation of the air bag device when a lid of a module case is opened.

As shown in FIG. 1, a seat S for a driver in an automobile having right-hand drive is comprised of a seat cushion 1 disposed substantially horizontally, a seat back 2 extending rearwards and upwards from a rear end of the seat cushion 1, and a head rest 3 mounted at upper end of the seat back 2. An air bag module M accommodated in a module case 4 is disposed in a right side face of the seat back 2, and when the air bag module M is operated, an air bag 5 forces the module case 4 open to become deployed laterally and forwardly so as to intervene between a right side of an occupant sitting on the seat S and a left side of a right front door 6 (see FIG. 7).

Figure 2:
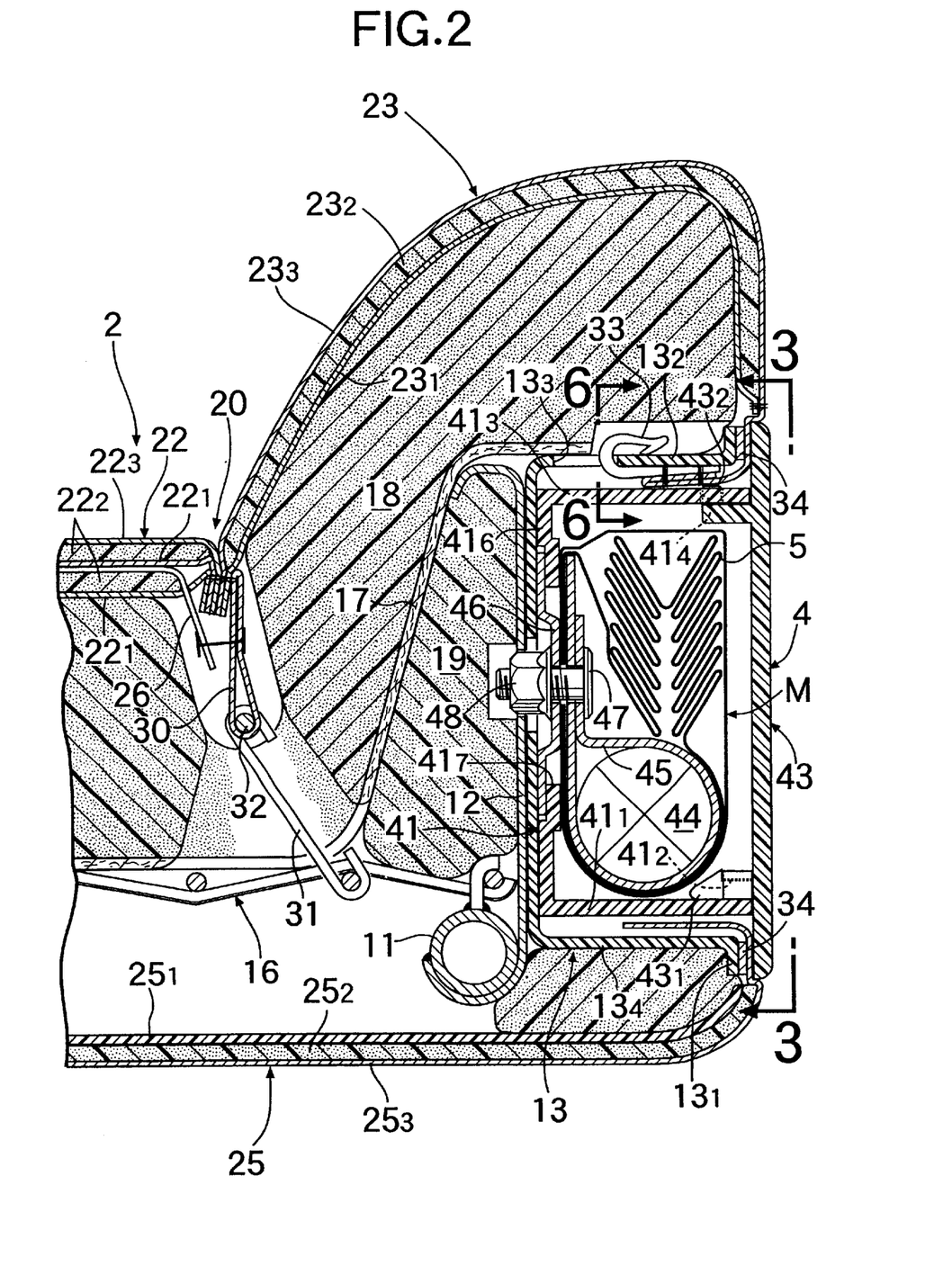
FIG. 2 is an enlarged sectional view taken along a line 2—2 in FIG. 1.

As can be seen from a cross section of the seat back 2 shown in FIG. 2, a module mounting bracket 12 made of a metal and extending forwardly in a vehicle body is fixed to a pipe frame 11 extending vertically along a right side edge of the seat back 2. A module case mounting box 13 made of a resin is fixed to the module mounting bracket 12, and the module case 4 having the air bag module M accommodated therein is fitted and fixed within the module case mounting box 13. A spring 16 is laid on an inner periphery of the pipe frame 11, and a shape retaining member 17 made of a coarse blanket and a pad 18 made of a sponge are disposed to extend from a front surface of the spring 16 to a front surface of the module case 4. A pad 19 made of a sponge is also disposed in an area surrounded by the spring 16, the shape retaining member 17 and the module case 4.

A central portion of a front surface of the seat back 2 is covered with a first cover member 22, and laterally opposite sides and an upper portion of the first cover member 22 are covered with a second cover member 23 sewn at a seam 20 to the first cover member 22, and a rear surface of the seat back 2 is covered with a third cover member 25 which covers a surface of a resinous plate $25_1$ with a wadding $25_2$ made of a sponge and a trim cover $25_3$ made of leather or cloth.

The first and second cover members 22 and 23 have the substantially the same structure and are comprised respectively of a wadding cover $22_1$, $23_1$ abutting against the pad 18, a wadding $22_2$, $23_2$ made of a thin sponge integrally coupled to a front surface of the wadding cover $22_1$, $23_1$, and a trim cover $22_3$, $23_3$ made of leather or cloth superposed on a front surface of the wadding $22_2$, $23_2$. In only the first cover member 22, the winding $22_2$ thereof is divided into two layers, and a single wadding cover $22_1$ and a heater 26 are interposed between the two layers.

A hanging sack 30 made by twice-folding a band-shaped material having a strength, such as a tricot, is integrally sewn to the seam 20 between the first and second cover members 22 and 23. A wire 32 made of stainless steel is accommodated within the hanging sack 30, and a plurality of hooks 31 are locked at their one ends to the wire 32 and at the other ends to the spring 16.

Figure 3:
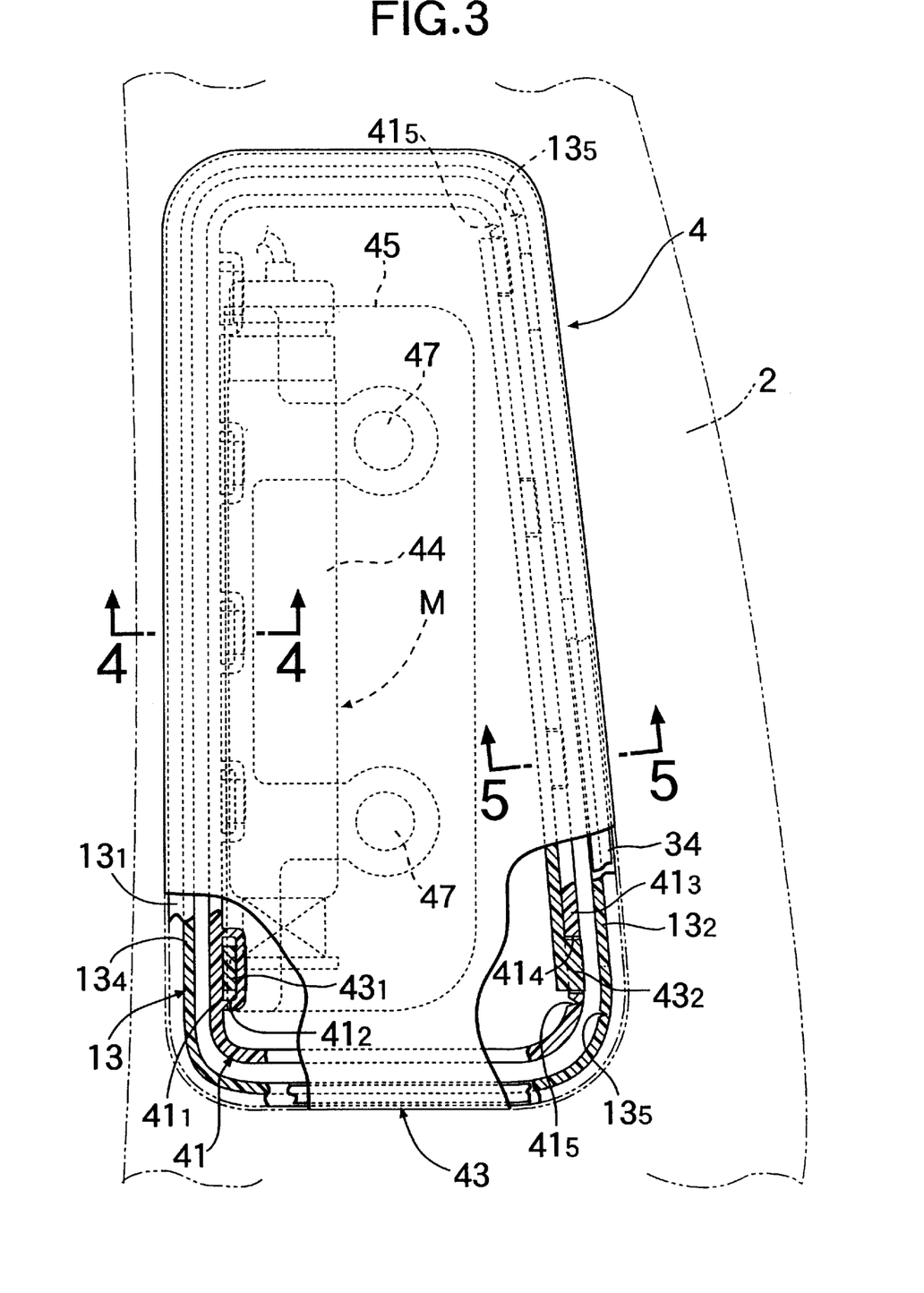
FIG. 3 is a view taken along a line 3—3 in FIG. 2.
Figure 4:
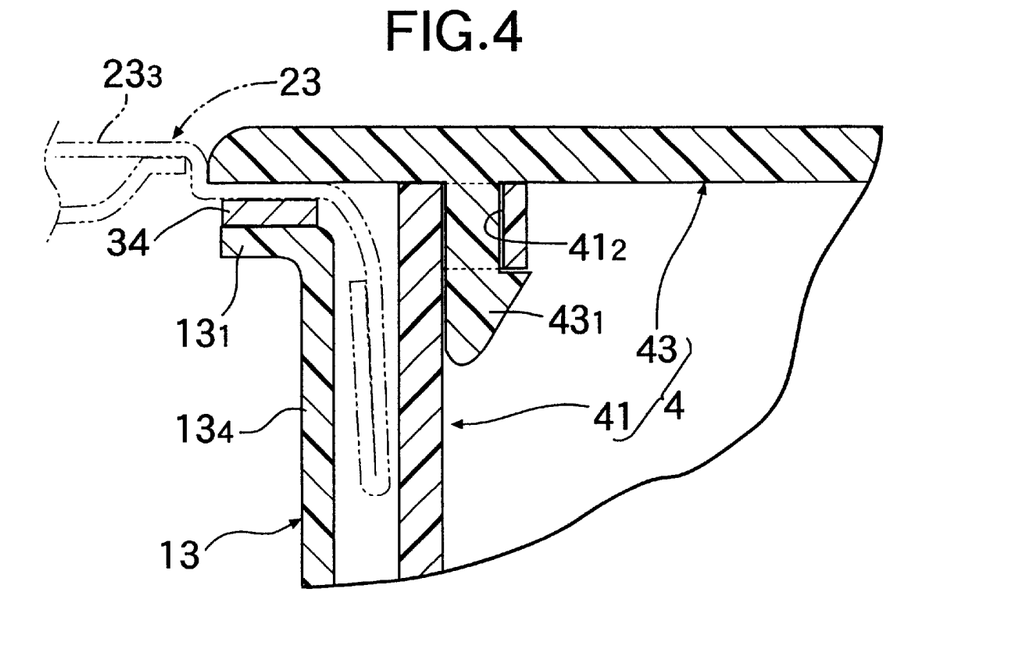
FIG. 4 is an enlarged sectional view taken along a line 4—4 in FIG. 3.
Figure 5:
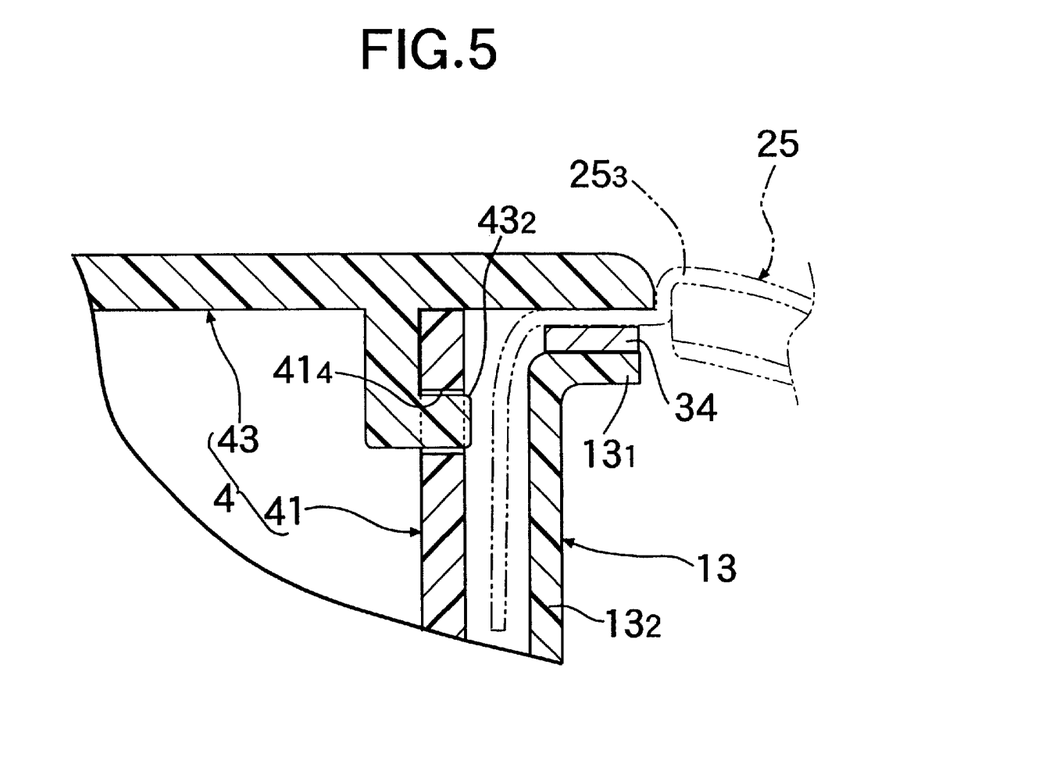
FIG. 5 is an enlarged sectional view taken along a line 5—5 in FIG. 3.
Figure 6:
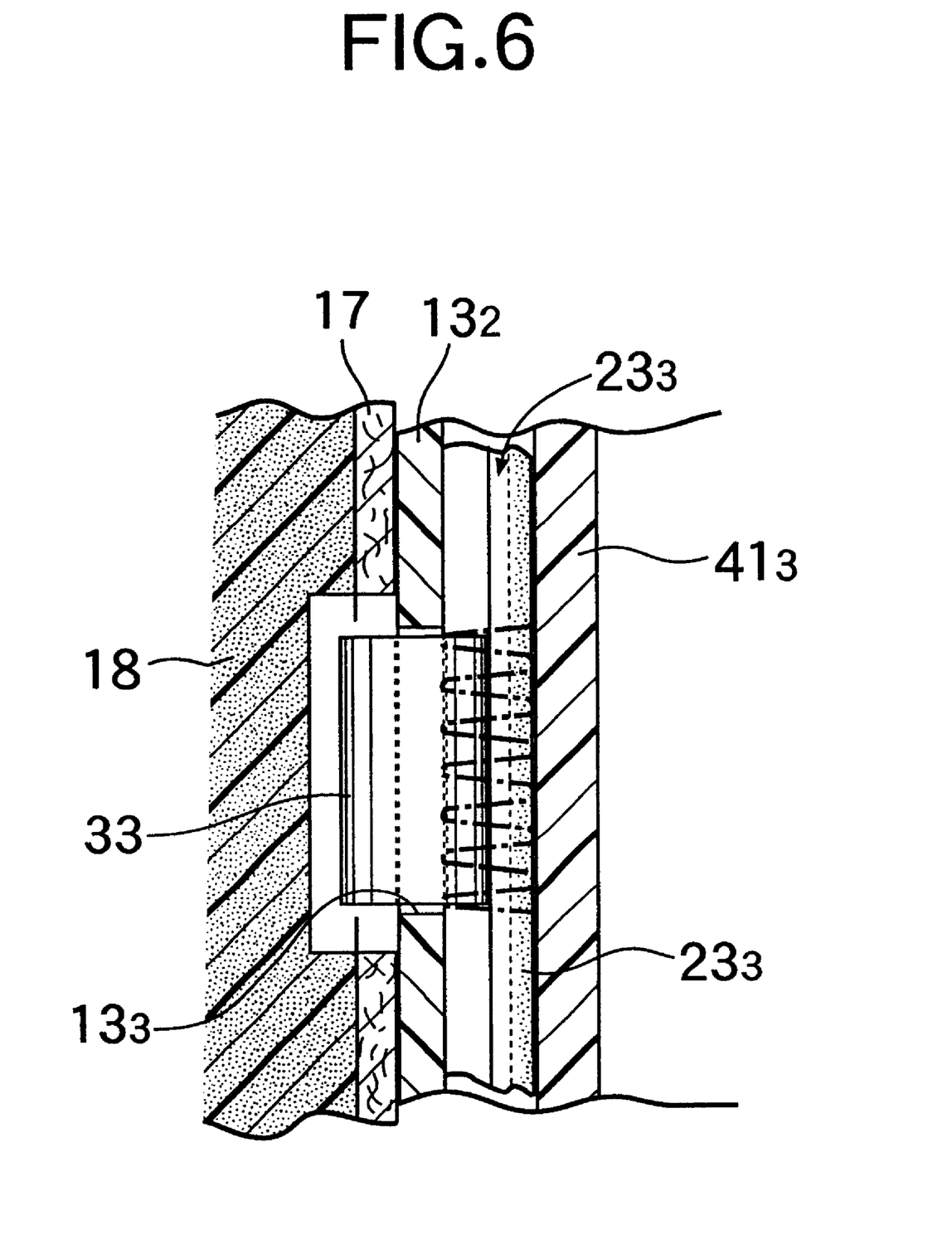
FIG. 6 is an enlarged sectional view taken along a line 6—6 in FIG. 2.

As can be seen from FIGS. 2, 3 and 6, the module case mounting box 13 is a vessel-shaped member having an opened portion facing the right side of the seat back 2, and has a flange $13_1$ extending outwards from the opened end thereof. A plurality of locking bores $13_3$ are defined in a front wall $13_2$ of the module case mounting box 13, and the plurality of hooks 33 provided at a rear edge of the trim cover $22_3$ of the second covering member 23 are locked in the locking bore $13_3$ from an inner surface of the front wall $13_2$ of the module case mounting box 13. At this time, the trim cover $23_3$ of the second cover member 23 is brought into abutment against the flange $13_1$ of the module case mounting box 13 through the resinous plate 34. The trim cover $25_3$ of the third cover member 25 is brought into abutment against the flange $13_1$ of the module case mounting box 13 through the resinous plate 34 and then wound around an inner surface of a rear wall $13_4$ of the module case mounting box 13.

Two tear lines $13_5$, $13_5$ (see FIG. 3) are formed in lengthwise opposite ends of the inner surface of the front wall $13_2$ of the module case mounting box 13 by reducing the thickness of the opposite ends so that the tear lines can be broken easily. Therefore, if a load is applied to the inner surface of the front wall $13_2$ of the module case mounting box 13, the tear lines $13_5$, $13_5$ are broken, whereby the front wall $13_2$ falls forwardly to form the principle or "primary" opening from the module box.

The structure of the module case 4 will be described below with reference to FIGS. 2 to 5.

The resinous module case 4 includes a vessel-shaped case body 41, and a plate-shaped lid 43 which covers an opened end of the case body 41. Five locking bores $41_2$ are defined in a rear wall $41_1$ of the case body 41, and five locking projections $43_1$ integrally formed on a back of the lid 43 are engaged into the locking bores $41_2$. Four locking bores $41_4$ are also defined in a front wall $41_3$ of the case body 41, and four locking projections $43_2$ integrally formed on the back of the lid 43 are engaged into the locking bores $41_4$. Therefore, the lid 43 is fixed to the case body 41 by the engagement of the locking projections $43_1$ in the locking bores $41_2$ and the engagement of the locking projections $43_2$ in the locking bores $41_4$.

Two tear lines $41_5$, $41_5$ (see FIG. 3) are formed in lengthwise opposite ends of the inner surface of the front wall $41_3$ of the case body 41 by reducing the thickness of the opposite ends so that the tear lines $41_5$, $41_5$ can be broken easily. Therefore, if a load is applied to the inner surface of the front wall $41_3$ of the case body 41, the tear lines $41_5$, $41_5$ are broken, whereby the front wall $13_2$ falls forwardly to form the "primary" opening in the case body 41.

The air bag module M accommodated in the module case 4 is comprised of an inflater 44 which is to be ignited by a signal from an acceleration sensor to generate a high-pressure gas, and the air bag 5 which expands by receiving the high-pressure gas supplied from the inflater 44. Peripheral edges of two openings $41_7$, $41_7$ defined in a bottom wall $41_6$ of the case body 41 are sandwiched between a retainer 45 retaining the inflater 44 and a stationary plate 46, and the retainer 45 and the stationary plate 46 are fastened to each other by bolts 47, 47 passed therethrough and by nuts 48, 48, whereby the air bag module M is fixed to the case body 41.

Thus, when the module case 4 having the air bag module M accommodated therein is fitted and fixed in the module case mounting box 13 from sideways of the seat back 2, the lid 43 of the module case 4 is substantially flush with the side face of the seat back 2, and the peripheral edges of the second and third cover members 23 and 25 pushed against the peripheral edges of the lid 43 are fixed to the flange $13_1$ of the module case mounting box 13 with the resinous plate 34 interposed therebetween. By detachably mounting the module case 4 to the side face of the seat back 2 in the above manner, it is ensured that the module case 4 can be removed from the seat back 2 so that the maintenance of the air bag module M in the module case 4 can be carried out easily.

The operation of the embodiment of the present invention having the above-described arrangement will be described below.

When a lateral acceleration equal to, or larger than a predetermined value upon side-collision of the vehicle has been detected, the inflater 44 of the air bag module M is ignited to expand the air bag 5 by the high-pressure gas generated. When the pressure resulting from the expansion of the air bag is applied to the inner surface of the lid 43 of the module case 4, the locking projections $43_2$ at the front edge of the lid 43 are deformed or broken to become separated from the locking bores $41_4$ in the case body 41, and the lid 43 is opened about a hinge provided by its rear edge, namely, about hinges provided by engaged portions of the locking projections $43_1$ of the lid 43 and the locking bores $41_2$ in the case body 41. As a result, a primary opening 49 is defined in a front portion of the module case 4, so that the air bag 5 is deployed through the opening 49 to intervene between the occupant and the inner surface of the right front door 6 (see FIG. 7).

Figure 8:
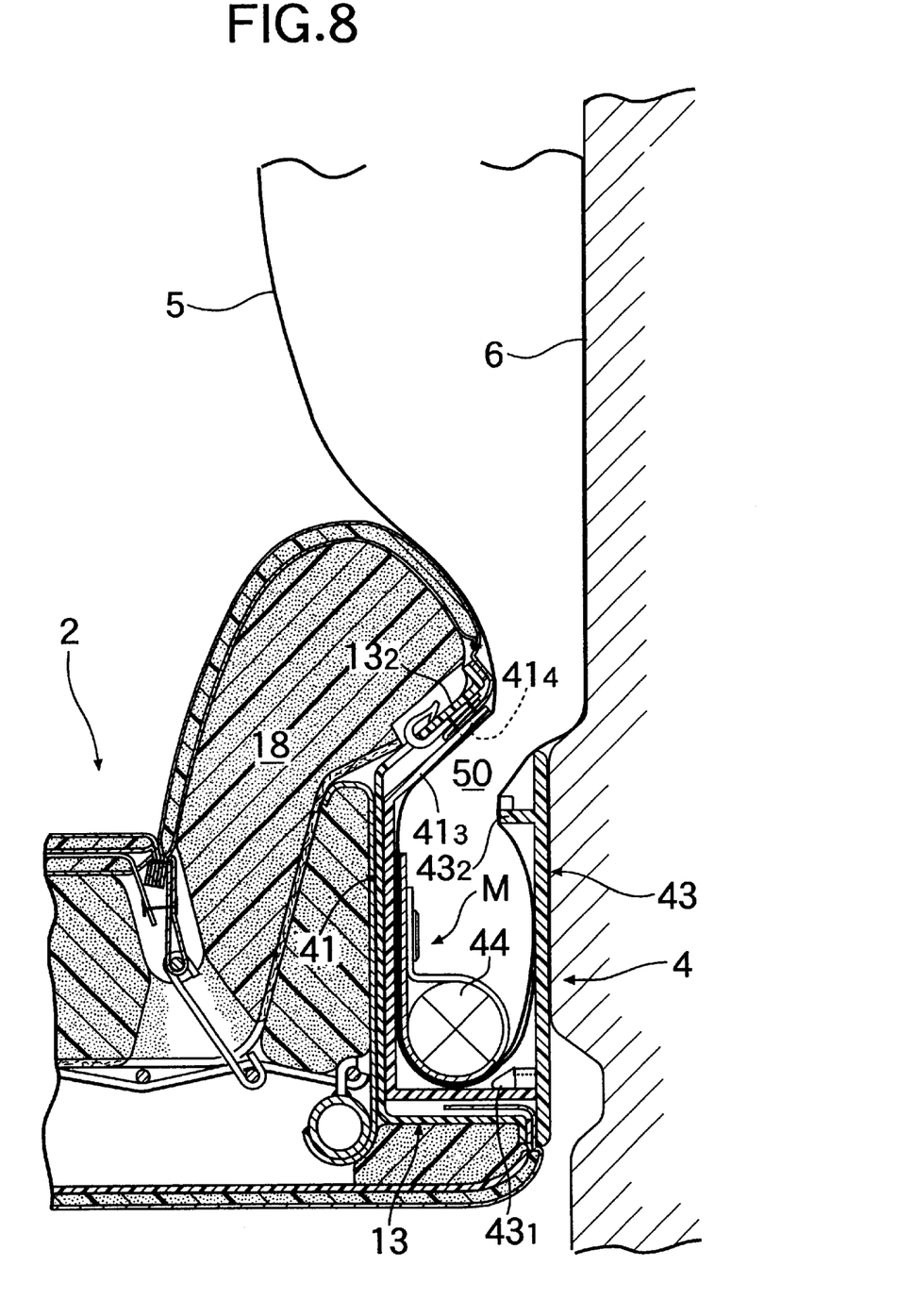
FIG. 8 is a view explaining the operation of the air bag device when a case body of the module case is opened.

When the right front door 6 is deformed to come close to the seat back 2 as a result of the vehicle being subjected to a rightward side collision, as shown in FIG. 8, the clearance between the inner surface of the right front door 6 and the lid 43 of the module case 4 may be decreased, whereby the lid 43 may not be opened in some cases. Even when the lid is not opened, however, if the pressure of the expanded air bag 5 is applied to the front wall $41_3$ of the case body 41, the two tear lines $41_5$, $41_5$ are broken, whereby the front wall $41_3$ is turned forwardly. Then, the module case mounting box 13 is urged forwardly by the front wall $41_3$ of the case body 41 turned forwardly, and the tear lines $13_5$, $13_5$ are broken, whereby the front wall $13_2$ is turned forward, while deforming the pad 18 of the seat back 2. As a result, an alternate, secondary opening 50 is defined in front of the case body 41, and the air bag 5 is deployed through the secondary opening 50 along the inner surface of the right front door 6 without hindrance.

For example, the tear lines $41_5$, $41_5$ in the case body 41 have been formed in the inner surface of the front wall $41_3$ in the embodiment, but tear lines $41_5$, $41_5$ may be formed in an outer surface of the front wall $41_3$. Further, the tear lines $41_5$, $41_5$ may be comprised of slits, or a large number of small bores or perforations continuously defined at small distances to make the wall of the case body frangible.

In addition, the module case 4 has been mounted in the module case mounting box 13 fixed to the side face of the seat back 2 in the embodiment, but the module case 4 may be mounted directly in a recess defined in the side face of the seat back 2.

Consequently, as discussed above, when the air bag of the air bag module accommodated in the case body of the module case is expanded due to a side collision of the vehicle, the lid of the module case is opened by the pressure of the expansion of the air bag, and the air bag is normally deployed through the primary opening defined in the air bag module into the vehicle compartment. If the vehicle door or the center pillar thereof is deformed upon the collision to come close to the seat back, whereby the lid of the module case is held down so that it cannot be opened, the tear line formed in the wall of the case body is broken by the pressure of expansion of the air bag to open the lid in an alternate direction different from the direction of normal, or "primary", opening of the lid, and hence the air bag can be deployed without hindrance through the secondary opening defined by the breaking of the tear line.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. A side-collision air bag device, comprising:

an air bag module having an air bag stored in a module case which is adapted for installation in a seat in a vehicle compartment;

wherein said module case comprises:

a case body having a lid openable to define a primary opening through which said air bag is deployed from said air bag module into said vehicle compartment upon expansion of said air bag by pressurization thereof; and a wall having a frangible portion defined by a tear line disposed in said case body other than said lid and facing in a direction different from that in which said lid faces, said tear line being broken by expansion of said air bag by pressurization thereof to define a secondary opening for deployment of said air bag into said vehicle compartment when deployment through said primary opening closed by said lid is prevented.

2. The side-collision air bag device according to claim 1 in which said air bag module is installed in a side face of a back of said seat.

3. The side-collision air bag device according to claim 1 in which said lid is disposed in facing relation to a side of said vehicle compartment and includes hinge means connecting said lid to said case body permitting pivotal movement of said lid with respect to said case body to form said primary opening.

4. The side-collision air bag device according to claim 1 in which said wall containing said tear line is deformable upon breaking of said tear line by expansion of said air bag to form said secondary opening for deployment of said air bag when deployment through said primary opening closed by said lid is prevented.

* * * * *